United States Patent
Biddle et al.

(10) Patent No.: US 12,545,217 B1
(45) Date of Patent: Feb. 10, 2026

(54) WHEEL-STABILIZING CHOCK SYSTEMS

(71) Applicant: Biddle and Winters Partnership, San Antonio, TX (US)

(72) Inventors: Douglas Glenn Biddle, Helotes, TX (US); James Michael Winters, Pattonville, TX (US)

(73) Assignee: Biddle and Winters Partnership, San Antonio, TX (US)

( * ) Notice: Subject to any disclaimer, the term of this patent is extended or adjusted under 35 U.S.C. 154(b) by 0 days.

(21) Appl. No.: 19/259,654

(22) Filed: Jul. 3, 2025

Related U.S. Application Data

(60) Provisional application No. 63/825,770, filed on Jun. 18, 2025, provisional application No. 63/737,609, filed on Dec. 20, 2024.

(51) Int. Cl.
*B60T 3/00* (2006.01)
*B60B 30/02* (2006.01)
*B60C 27/00* (2006.01)

(52) U.S. Cl.
CPC ............... *B60T 3/00* (2013.01); *B60B 30/02* (2013.01); *B60C 27/003* (2013.01)

(58) Field of Classification Search
CPC .......... B60T 3/00; B60B 30/02; B60C 27/003
See application file for complete search history.

(56) References Cited

U.S. PATENT DOCUMENTS

| | | | | |
|---|---|---|---|---|
| 2,630,192 | A * | 3/1953 | Stenhouse | B60T 3/00 188/32 |
| 2,954,101 | A * | 9/1960 | Corson | B60T 3/00 D12/217 |
| 3,065,827 | A | 11/1962 | Timbers | |
| 3,289,794 | A * | 12/1966 | Miles | B60T 3/00 188/32 |
| 3,664,466 | A * | 5/1972 | Rotheiser | B60T 3/00 188/32 |
| 3,800,917 | A * | 4/1974 | Vick | B60T 3/00 188/32 |
| 5,100,054 | A | 3/1992 | Fickett et al. | |
| D501,818 | S | 2/2005 | Bateman | |
| D502,138 | S | 2/2005 | Bateman | |
| 7,168,527 | B2 * | 1/2007 | Bateman | B60T 3/00 188/32 |
| D546,749 | S | 7/2007 | Bateman | |
| D662,026 | S | 6/2012 | Beranek et al. | |
| D690,644 | S | 10/2013 | Bowman et al. | |
| 10,906,512 | B2 | 2/2021 | Gregory | |
| 11,097,697 | B2 | 8/2021 | Hu | |
| 11,479,217 | B2 | 10/2022 | Palmer et al. | |
| D987,542 | S | 5/2023 | Jette et al. | |
| D1,001,047 | S | 10/2023 | Hu | |
| 2007/0050999 | A1 * | 3/2007 | Milner | B65G 69/2882 33/286 |

* cited by examiner

*Primary Examiner* — Ryan J. Walters
(74) *Attorney, Agent, or Firm* — Volk & McElroy, LLP; Michael D. Volk, Jr.

(57) ABSTRACT

An apparatus and method for stabilizing a vehicle wheel during installation while the vehicle wheel is suspended above a ground surface and not under load. A support structure is configured with a plurality of teeth or engagement points in a staggered and distributed configuration to engage the tread portion of the suspended tire and resist wheel rotation during torquing of wheel fasteners.

18 Claims, 11 Drawing Sheets

WHEEL-STABILIZING CHOCK SYSTEMS

CROSS REFERENCE TO RELATED APPLICATIONS

The present application is related to and claims the benefit of U.S. Provisional Patent Application No. 63/737,609, filed Dec. 20, 2024, titled "TORQUE CLAW", and is also related to and claims the benefit of U.S. Provisional Patent Application No. 63/825,770, filed Jun. 18, 2025, titled "WHEEL-STABILIZING CHOCK SYSTEMS".

DETAILED DESCRIPTION

The present disclosure relates to an apparatus and method for assisting in the torquing of threaded wheel fasteners to properly secure a wheel to a wheel hub assembly. More particularly, it relates to an apparatus configured to restrain wheel rotation during the torquing process. Improperly torquing a wheel onto a wheel hub assembly can lead to disastrous and even deadly outcomes. A wheel that is not properly installed may separate from the wheel hub during vehicle operation, resulting in a catastrophic wheel-off failure.

According to NHTSA, NIRA, and other agencies, there are over 30,000 wheel-off occurrences annually across the U.S. resulting in over 900 accidents and over 400 deaths. Even without an accident, wheel-off events cause over $45,000,000.00 in damage that insurance companies must cover, or a vehicle owner pays out of pocket.

When changing or reinstalling vehicle wheels, especially during the torquing of threaded wheel fasteners on a raised vehicle, the wheel may rotate, making it difficult to apply proper and consistent torque. Traditional wheel and tire mounting methods require the vehicle to be lowered so the tire contacts the ground surface before torquing can occur. This additional step slows down the mounting process and is frequently skipped, which can result in dangerously under-tightened threaded fasteners. A more efficient means of restraining wheel rotation during the torquing procedure, without requiring the vehicle to be lowered, would be highly beneficial.

Implementations of the present disclosure provide an apparatus and method for assisting in the proper torquing of lug nuts and similar threaded fasteners during the installation or reinstallation of a vehicle wheel onto a wheel hub assembly. Further, implementations of the present disclosure provide an apparatus configured to restrain rotation of the wheel during torquing operations, thereby enabling the application of consistent and proper torque. Moreover, installation vehicle wheels using implementations of the present disclosure improve safety by reducing the risk of wheel-off failures caused by under-tightened threaded fasteners. Additionally, implementations of the present disclosure eliminate the need to lower the vehicle to the ground to restrain the wheel prior to torquing, thus streamlining the wheel mounting process. Even further, implementations of the present disclosure provide an apparatus that is portable, easy to use, and compatible with a wide range of vehicle types and wheel sizes.

Implementations of the present disclosure will now be described in conjunction with the appended drawings, in which like designations denote like elements.

Figure 1:
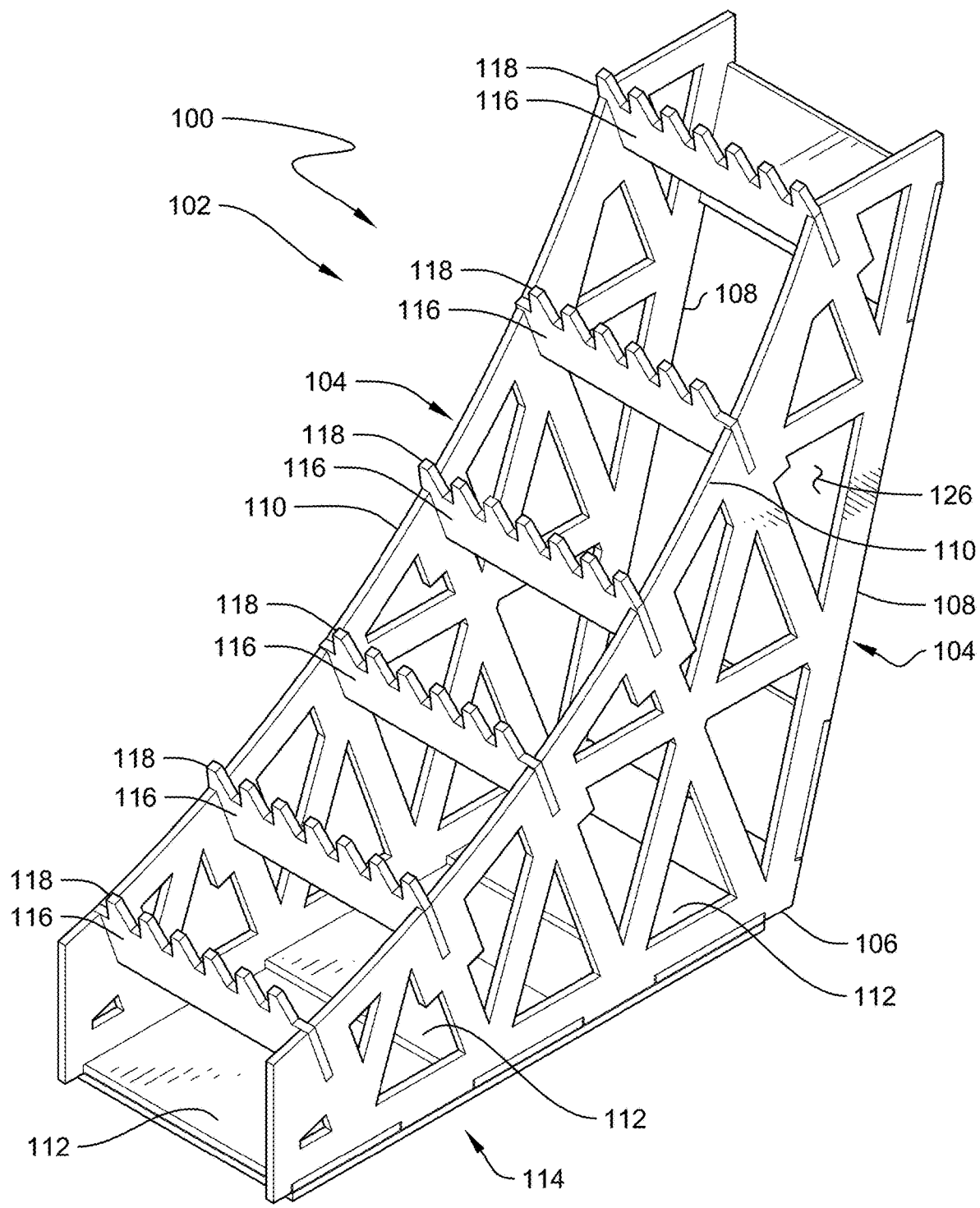
FIG. 1 is a perspective view, illustrating a wheel-stabilizing chock.

FIG. 1 is a perspective view of wheel-stabilizing chock 102 of the wheel-stabilizing chock system 100. Wheel-stabilizing chock 102 includes a pair of side members 104. Side members 104 are configured to provide lateral structural support and define the general profile of the apparatus. Each side member 104 has a bottom portion 106, a rear portion 108, and a curved upper portion 110, as shown. A set of base plates 112 span the bottom portions 106 of side members 104 forming a base 114 of wheel-stabilizing chock 102. In the implementation shown in FIG. 1, three base plates 112 are shown. Other numbers of base plates may suffice in other implementations. A plurality of toothed rails 116 span the side members at positions along curved upper portion 110, as shown. Each toothed rail 116 comprises a plurality of teeth 118 (engagement points) configured to engage with a tread of a tire mounted to a wheel, as illustrated in FIG. 2 and FIG. 3.

Figure 2:
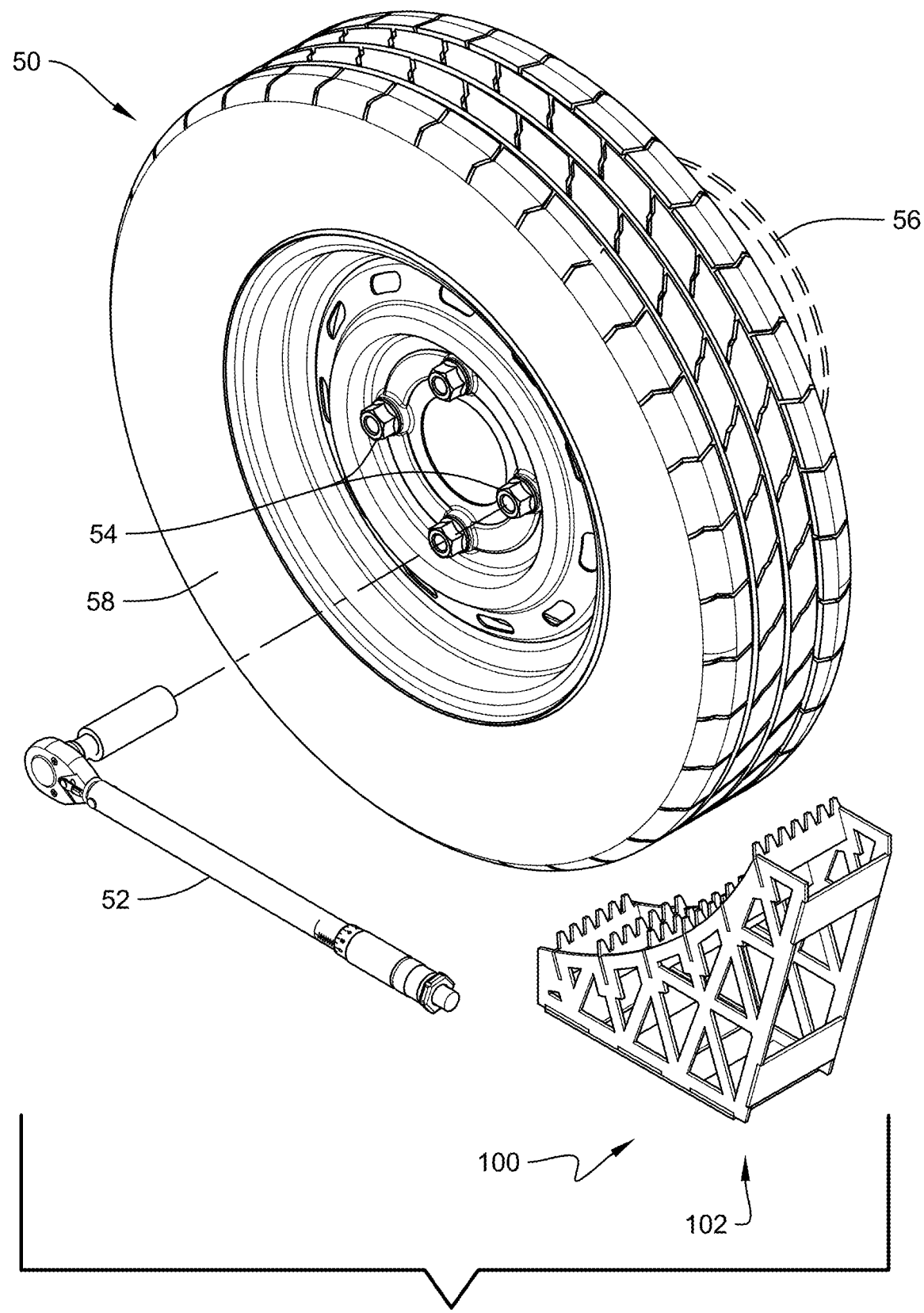
FIG. 2 is a perspective view of the wheel-stabilizing chock of FIG. 1, shown positioned adjacent to a vehicle wheel and showing a torque wrench used during the mounting procedure to torque the threaded fasteners securing the wheel.
Figure 3:
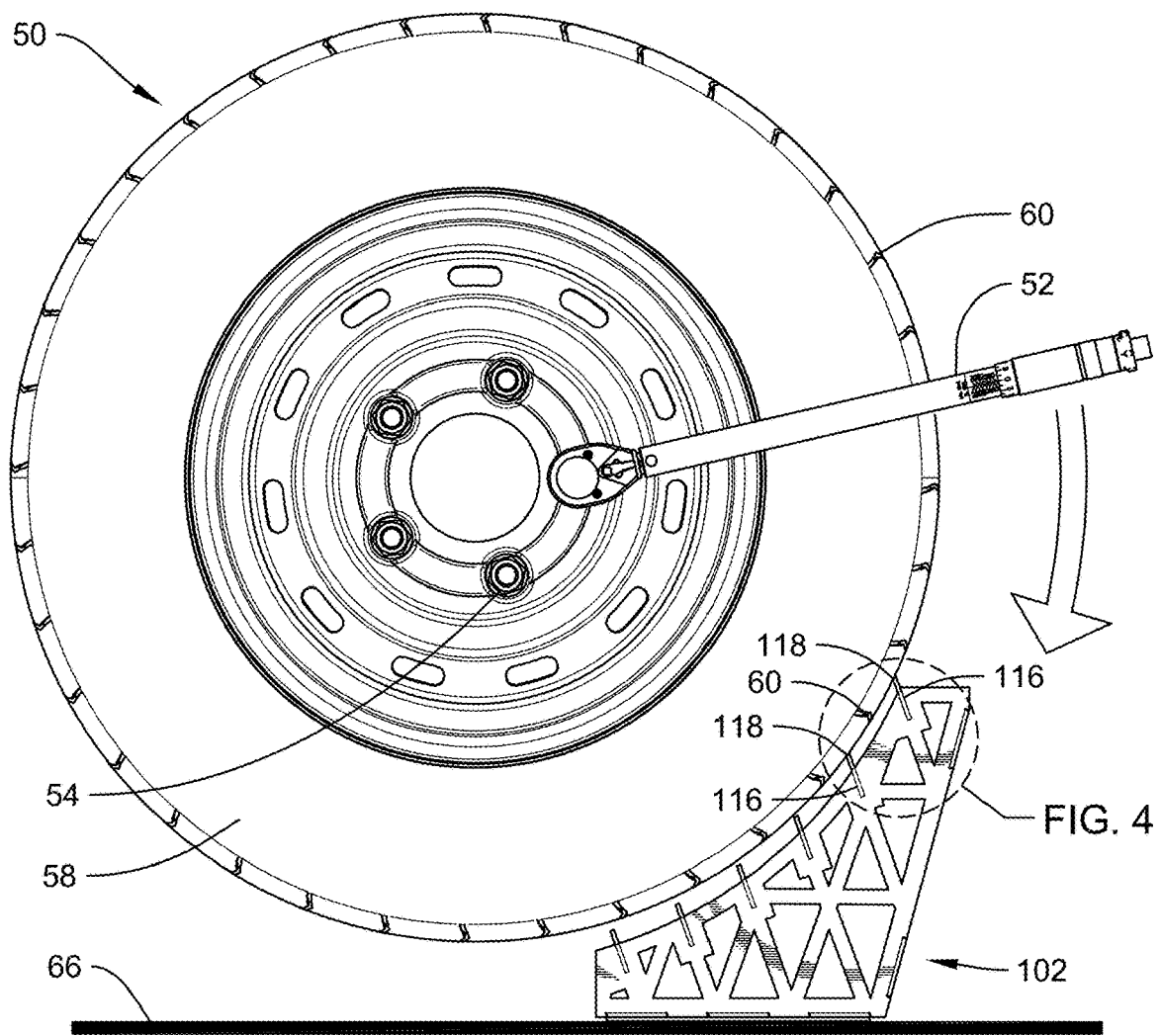
FIG. 3 is a side view showing the wheel-stabilizing chock in a position of engagement with a tire of the vehicle wheel, with the torque wrench engaged with a threaded fastener used to secure the vehicle wheel.

FIG. 2 is a perspective view of the wheel-stabilizing chock 102 of FIG. 1, shown positioned adjacent to vehicle wheel 50 and including torque wrench 52 used during the mounting procedure to torque a set of threaded fasteners 54 securing the vehicle wheel to wheel hub assembly 56. FIG. 3 is a side view showing wheel-stabilizing chock 102 in a position of engagement with tire 58 of vehicle wheel 50, with torque wrench 52 engaged with threaded fastener 54 used to secure vehicle wheel 50 to wheel hub assembly 56. As used herein, the term "threaded fastener" is intended to encompass various types of threaded hardware commonly used to secure a vehicle wheel or rim to a wheel hub assembly. These fasteners may include, but are not limited to, lug nuts (e.g., conical seat, spherical seat, flat seat, or flange types), lug bolts (threaded studs integral with a bolt head), wheel bolts, and wheel studs used in combination with separate lug nuts. The present disclosure is not limited to any particular fastener style or configuration and is intended to be compatible with standard fastener systems used in passenger vehicles, trucks, trailers, off-road vehicles, and other wheeled platforms.

To secure vehicle wheel 50 to wheel hub assembly 56, a four-step process known in the vehicle maintenance industry by the acronym "RIST" is often employed. The RIST procedure was developed by the U.S. Tire Industry Association (TIA) to help educate wheel installation technicians on the correct procedure for installing wheels and rims. RIST stands for "Remove foreign objects" (from wheel hub assembly 56 or vehicle wheel 50), "Inspect components", "Snug fasteners" (threaded fasteners 54) and "Torque to specs".

The apparatuses and methods of present disclosure avoid a wheel installation technician needing to lower a vehicle until a light load is placed on the tire (which is used to keep the tire/wheel assembly from turning while torquing due to ground contact). In practice, wheel installation technicians lower vehicles inconsistently. Some technicians will follow proper installation procedures, while others will place different loads on the wheel hub or drum assemblies, including lowering the vehicle lift until the full weight of the vehicle is on the un-torqued assembly. This allows the shifting of wheel or rim that can result in a wheel-off failure. Other technicians might just use an impact wrench and overtighten the lugs causing the lug bolts/studs to reach their yield point and break off while the vehicle is in motion, causing a wheel-off situation.

The apparatuses and methods of the present disclosure provide a wheel installation technician with the ability to torque threaded fasteners 54 while the vehicle wheel 50 is elevated and unloaded, without rotation of the vehicle wheel 50 during the torquing procedure. This improves both efficiency and safety by eliminating the need to lower the vehicle prior to torquing.

In a procedure for attaching vehicle wheel 50 to a raised vehicle, the technician first aligns and engages vehicle wheel 50 with mounted tire 58 onto the wheel hub assembly 56. Once properly seated, threaded fasteners 54, which may include lug nuts, lug bolts, or other common fastener types, are hand-tightened in a standard cross-pattern or as specified by the vehicle manufacturer. With the vehicle wheel 50 still in a raised position with tire 58 located about 3 to 4 inches above ground surface 66, wheel-stabilizing chock 102 is then positioned adjacent tire 58. As most wheel fasteners are tightened using clockwise rotation, wheel-stabilizing chock 102 is positioned adjacent the right side of tire 58 to prevent a corresponding clockwise rotation of the vehicle wheel.

As the technician advances the chock, teeth 118 of the toothed rails 116 firmly engage with the tire tread 60, as shown. This engagement is sufficient to prevent rotational movement of the vehicle wheel during the subsequent application of torque. Wheel-stabilizing chock 102 is configured to restrain the rotation of vehicle wheel 50 through direct mechanical contact, thereby allowing the technician to apply torque to the threaded fasteners 54 using a torque wrench 52 or similar tool while the wheel remains securely suspended above the ground surface.

This method facilitates accurate and consistent torquing without the need to prematurely lower the vehicle and helps attain proper clamping force between the wheel and hub assembly, reducing the risk of wheel-off events due to under/over-tightening.

Figure 4:
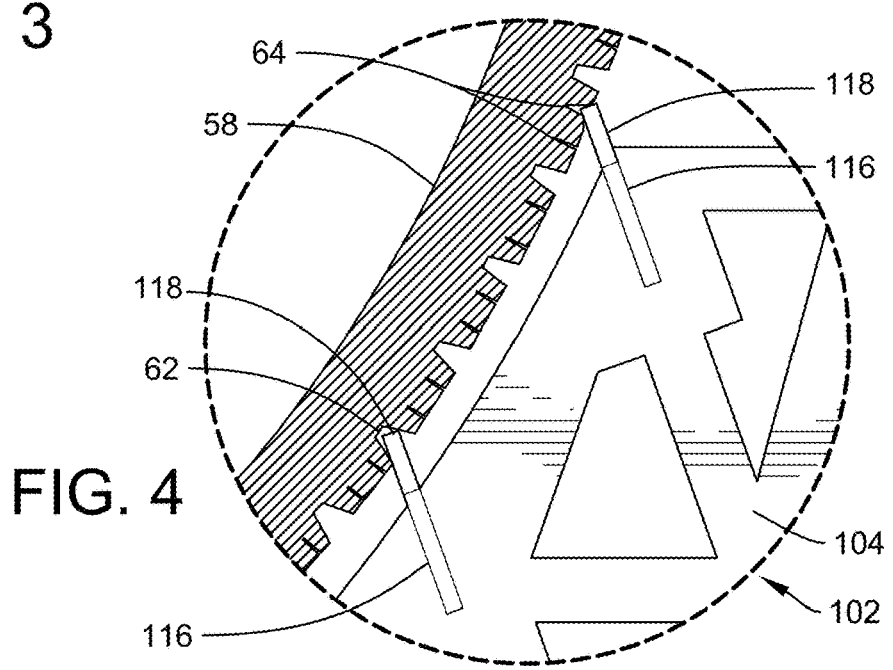
FIG. 4 is a partial enlarged view of the wheel-stabilizing chock of FIG. 1, illustrating an arrangement of toothed rails in contact with a tread portion of the tire, the tread portion shown in section for clarity.

FIG. 4 is a partial enlarged view, illustrating an arrangement of toothed rails 116 of wheel-stabilizing chock 102 in contact with the tread 60 of tire 58. In the partial enlarged view of FIG. 4, tread 60 shown in section for clarity.

Toothed rails 116 are configured with a series of rigid teeth 118 that protrude outwardly from the toothed rails 116. These teeth are arranged in a unique staggered pattern to promote engagement with most pneumatic tire tread designs, allowing the plurality of teeth 118 to nest securely within the tread structure when the apparatus is pressed against the tire.

In the illustrated disclosure of FIG. 4, teeth 118 of a pair of toothed rails 116 are shown engaging tread 60 of tire 58. The orientation, profile and staggered arrangement of teeth 118 are such that, when wheel-stabilizing chock 102 is urged into position against tire 58, the teeth wedge into the tread grooves 62 and tread sipes 64 (small slits in the tread of some tires) and resist rotation of wheel 50. This mechanical interlock between teeth of toothed rails 116 and tread 60 provides a substantial frictional and geometric restraint, effectively fixing wheel 50 against rotation during torquing of lug nuts, lug bolts, or other threaded fasteners 54. In practice, wheel 50 may rotate slightly during initial torquing; however, rotation is quickly arrested as teeth 118 firmly seat within the tread structure. In some instances, the technician may press the chock into engagement with the tire by hand and then maintain pressure using a foot, thus ensuring that the apparatus remains securely in place during the torquing procedure. The technician may include this step when working with performance tires or those with shallow touring-type treads.

The sectioned view of tread 60 further highlights the operative engagement between teeth 118 and the tire surface, showing that teeth 118 extend into both tread grooves 62 and tread sipes 64 (if present) rather than merely contacting the outer surface of tire 58. This depth of engagement increases the stability of the restraint and enhances the ability of wheel-stabilizing chock 102 to hold vehicle wheel 50 in a stationary position, even when torque forces are applied.

The arrangement is particularly advantageous in that the vehicle wheel 50 can remain elevated and unloaded, as wheel fasteners 54 are torqued to specification, without requiring a downward force from the vehicle's weight to immobilize the wheel. Wheel-stabilizing chock 102 thereby enables secure torquing procedures to be conducted while vehicle wheel 50 is suspended, reducing the risk of under-tightening due to wheel movement or misalignment with the hub.

Figure 5:
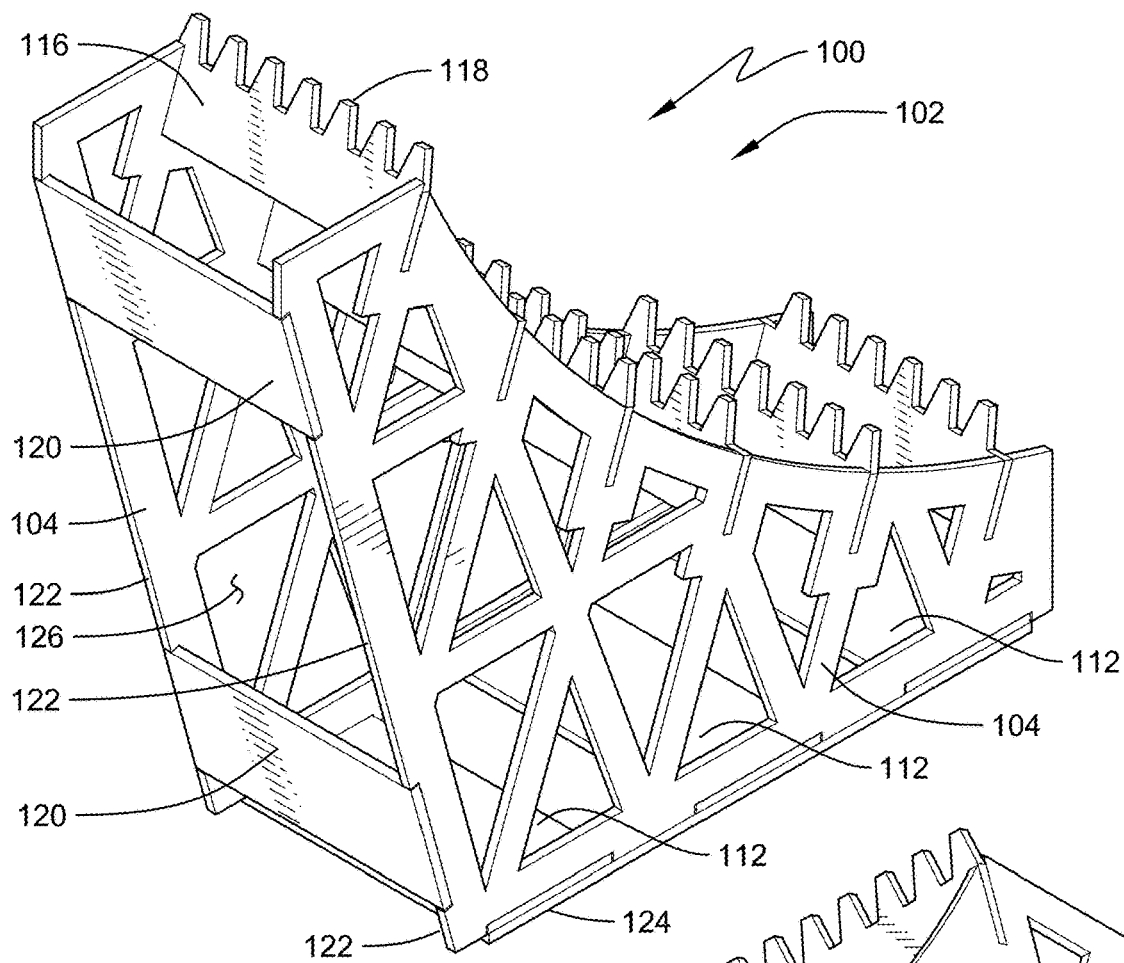
FIG. 5 is a rear perspective view of the wheel-stabilizing chock of FIG. 1.
Figure 6:
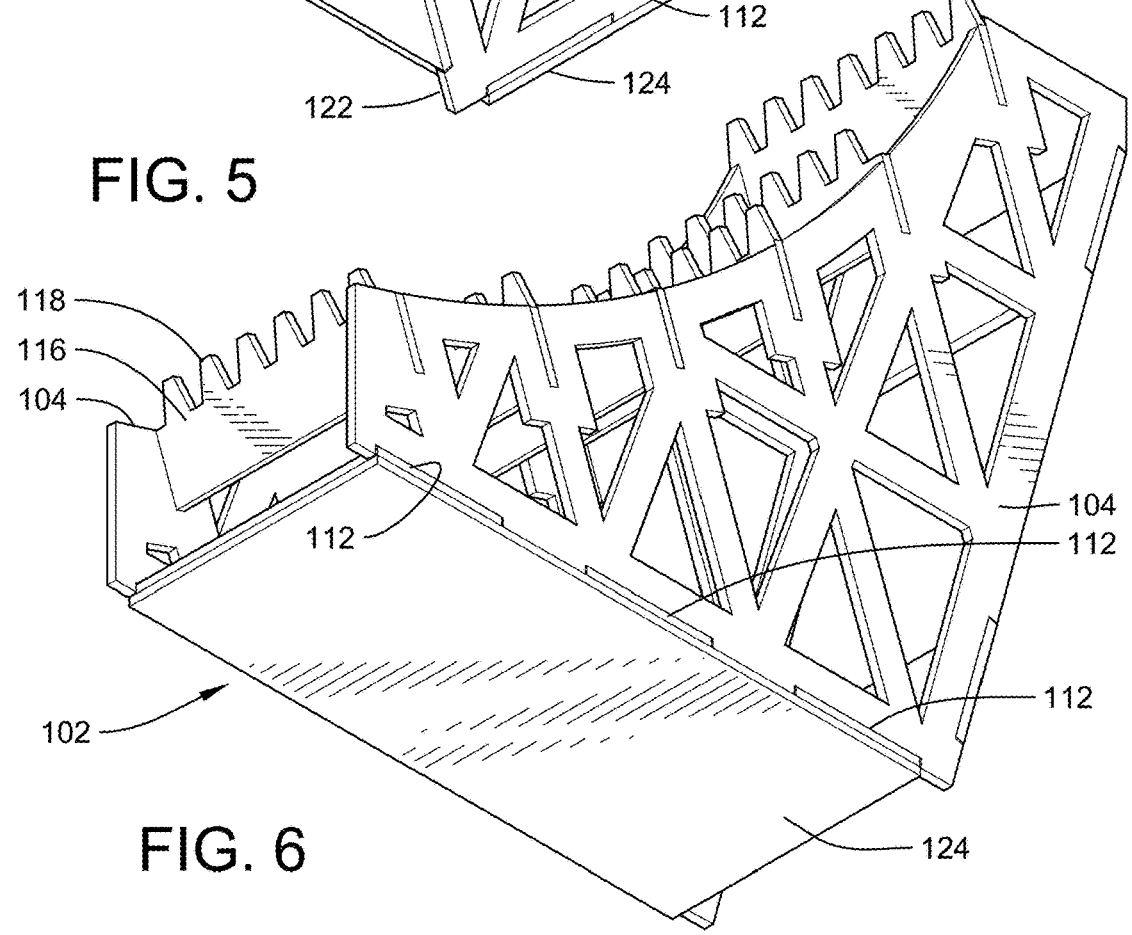
FIG. 6 is a bottom perspective view of the wheel-stabilizing chock of FIG. 1.

FIG. 5 is a rear perspective view, illustrating wheel-stabilizing chock 102 of FIG. 1. FIG. 6 is a bottom perspective view, further illustrating structures and features of wheel-stabilizing chock. Wheel-stabilizing chock 102 is shown with a pair of rear plates 120 that span between side members 104, positioned along the respective rear portions 122 of the side members. Rear plates 120 are rigidly affixed to the side members 104 and serve to geometrically position and stabilize the side members relative to one another. This structural arrangement enhances the overall rigidity of the apparatus and maintains proper alignment of the side members during use.

Wheel-stabilizing chock 102 further includes one or more base plates 112 that span bottom portions 106 of the side members 104, forming the lower structural boundary of the apparatus. Base plates 112 extend laterally between the side members. In one implementation, three base plates 112 extend laterally between the side members, as shown. These plates provide a stable foundation for the apparatus and support the applied forces generated during wheel restraint and torquing procedures. In this implementation, a frictional pad 124 comprising a slip-prevention material is affixed to the underside of the base plates. Constructed of rubber or a similar resilient, high-friction material, this frictional pad 124 is configured to engage the ground surface 66 and resist slipping or movement of the chock during use. This arrangement improves safety and effectiveness by ensuring wheel-stabilizing chock 102 remains stationary while the technician applies torque to the wheel fasteners.

Figure 7:
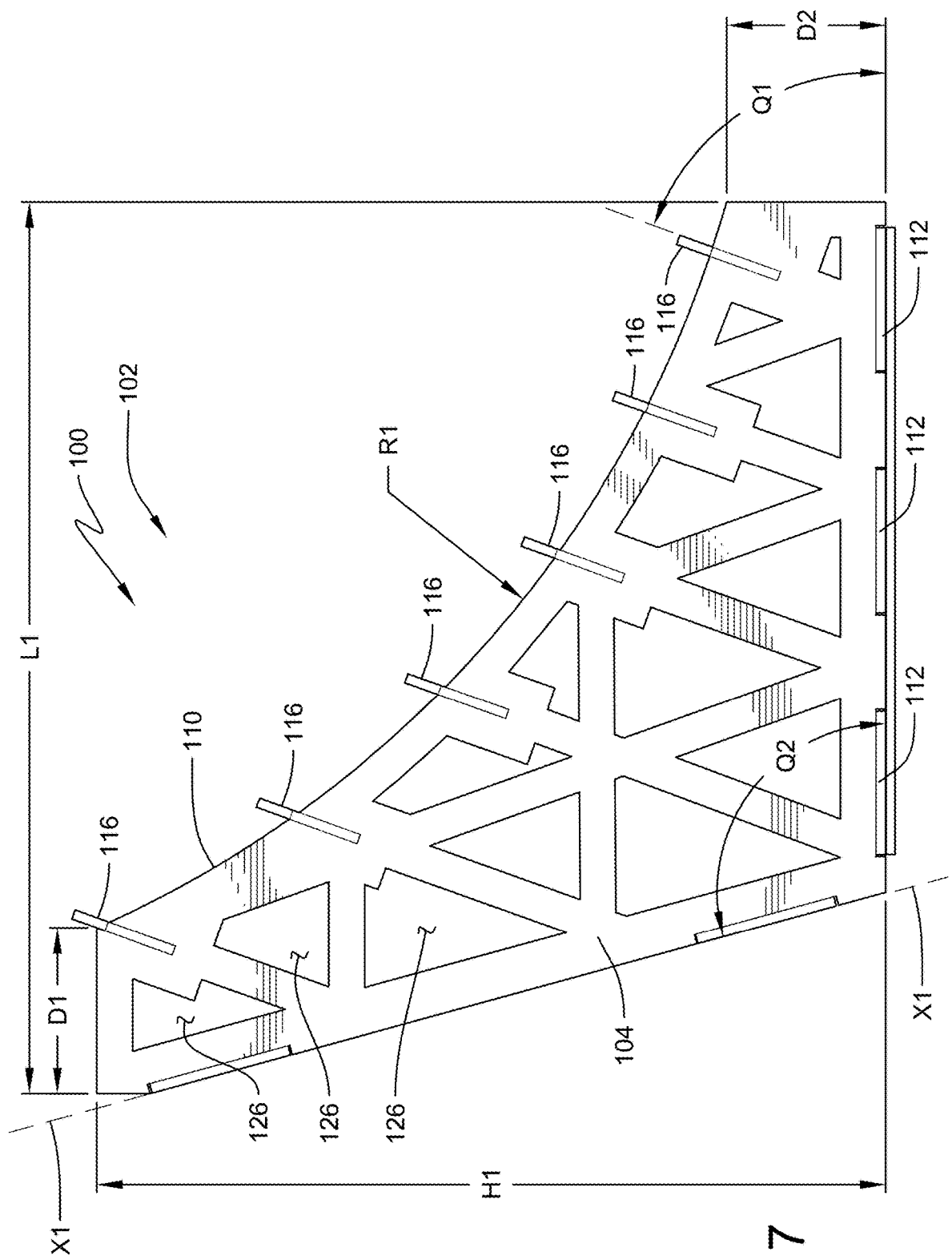
FIG. 7 is a side view of the wheel-stabilizing chock of FIG. 1.

FIG. 7 is a side view of wheel-stabilizing chock 102 as shown in FIG. 1. Visible in the side view are the plurality of toothed rails 116, each engaged with side members 104 along their respective curved upper portions 110. In one implementation of the present disclosure, wheel-stabilizing chock 102 has six toothed rails 116 spaced approximately evenly along curved upper portions 110 of side members 104. In the present implementation, each toothed rail 116 is oriented at a defined angle Q1 relative to base plates 112. In one implementation, the defined angle Q1 is approximately 70 degrees. This angle optimizes the engagement of toothed rails 116 with a wide range of tire treads. Referring again to FIG. 4, the angle Q1 allows teeth 118 of the toothed rails to enter the tread grooves 60 at an orientation that is effective in maximizing grip and resisting rotational movement of tire 58 during torquing.

With continued reference to FIG. 7, curved upper portion 110 (also referred to as arcuate portion) of side member 104 comprises a generally arcuate shape having a radius R1 that approximates the curvature of standard passenger and light-truck vehicle tires when viewed in side profile. In one implementation of the present disclosure, radius R1 is about 15.7 inches. By conforming to the general curvature of the tire's outer circumference, the toothed rails mounted along the curved upper portion can maintain consistent angular alignment with the tread thereby enhancing engagement across a greater portion of the tire's circumference. This implementation also enables an even load distribution across the tread structure, thereby increasing the overall stability and effectiveness of the chock during use. The radius R1 also aids in accommodating a range of tire diameters while preserving optimal engagement geometry across different tire profiles. Curved upper portion 110 is spaced apart from the rear portion 108 by a first minimum distance D1 of approximately 2.3 inches, and from the bottom portion 106 by a second minimum distance D2 of approximately 2.2 inches. The rear portion 108 of wheel-stabilizing chock 102 defines a longitudinal axis X1, which intersects the bottom portion 106 at an angle Q2 of approximately 105.3 degrees. The distances D1 and D2, in combination with angle Q2, provide a region of side-plate material between the curved upper portion 110 and the rear portion 108, and between the curved upper portion 110 and the bottom portion 106, sufficient to withstand mechanical loads encountered during use. This arrangement is specifically configured to eliminate extraneous material, thereby optimizing structural integrity while reducing overall weight and material cost.

In implementations of the present disclosure, each side member 104 comprises a rigid plate fabricated from a durable, high-strength material suitable for withstanding repeated mechanical loading and environmental exposure. In various implementations, each side member 104 includes a plurality of apertures 126, as shown. These apertures serve to reduce the overall weight of the apparatus without compromising its structural integrity, thereby enhancing portability and ease of use in the field. In the depicted implementation, apertures 126 are arranged to form an open truss-like structure. Upon reading this specification, it should be appreciated that, under appropriate circumstances, considering such issues as material selection, design preference, structural requirements, etc., other aperture arrangements such as, for example, circular, elongated, or other shapes and may be suitable.

Wheel-stabilizing chock 102 has an overall height and an overall length designed to provide a compact yet stable form factor that accommodates standard passenger and light-truck vehicle tire sizes while maintaining ease of handling and portability. The height is configured to enable the chock to engage a sufficient portion of the tire tread when the wheel is elevated to ensure effective restraint against rotation. The length is selected to ensure the longitudinal stability of wheel-stabilizing chock 102 on the ground surface 66 during use, having a size sufficient to resist shifting when torque is applied to the wheel fasteners. Wheel-stabilizing chock 102 has an overall height H1 of approximately 11 inches and an overall length L1 of approximately 12.44 inches. These dimensions provide a balance between function, user ergonomics, and manufacturability. Upon reading this specification, it should be appreciated that, under appropriate circumstances, considering such issues as vehicle application, wheel and tire size, tire tread design, user preference, material selection, cost, etc., other apparatus dimensions such as, for example, larger or smaller dimensional values, alternate geometrical arrangements, etc., may be sufficient.

Figure 8:
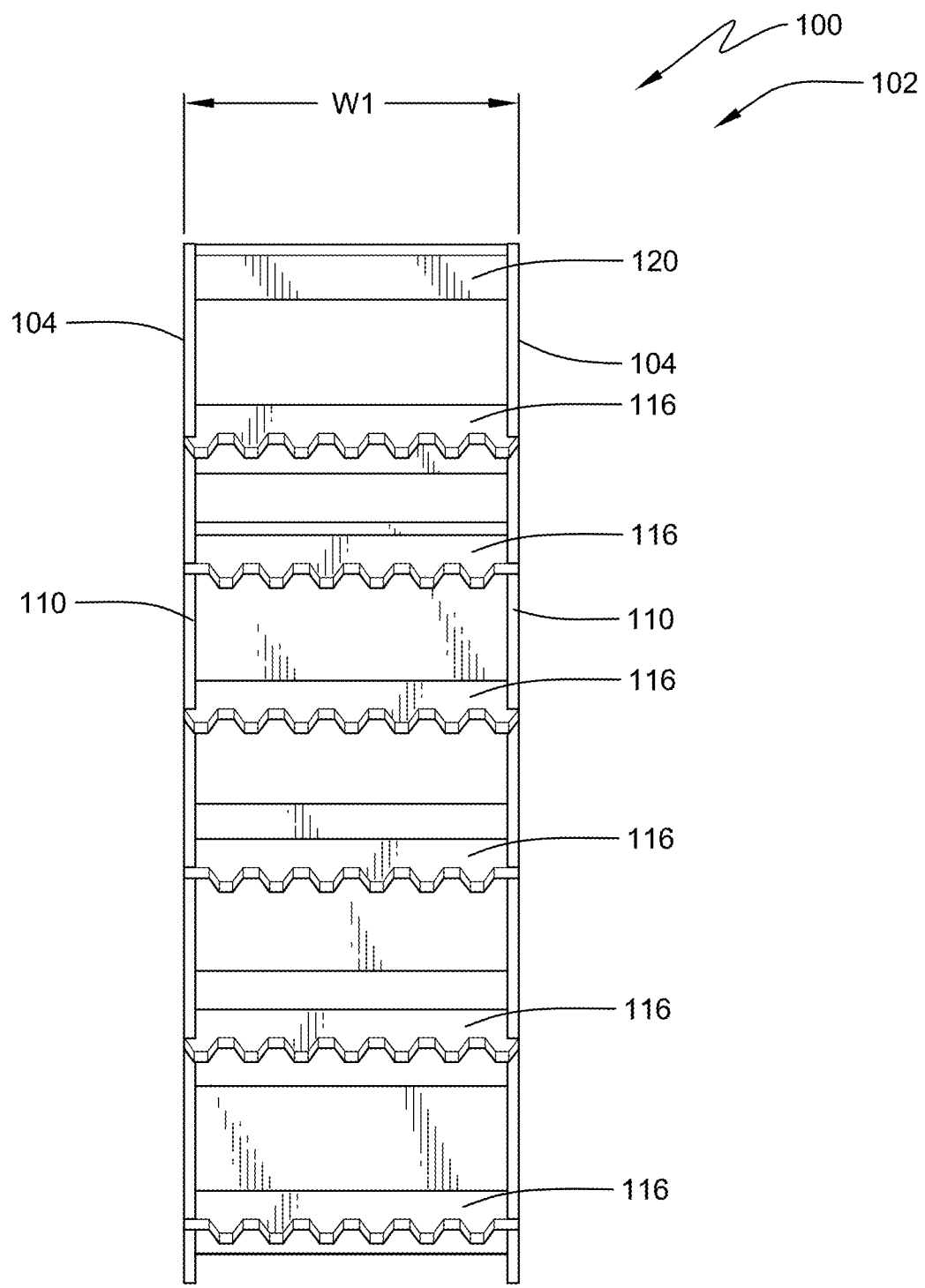
FIG. 8 is a top plan view of the wheel-stabilizing chock of FIG. 1.

FIG. 8 is a top plan view further illustrating the physical arrangement of wheel-stabilizing chock 102. In one implementation of the present disclosure, side members 104 are oriented substantially parallel to each other and are spaced apart by a width W1 of approximately 4 inches. This spacing is selected to enable effective engagement between the toothed rails and the tire tread, while still maintaining portability and ease of handling of the apparatus.

An arrangement of 6 toothed rails 116 span between side members 104. Each toothed rail 116 is rigidly affixed to the side members 104 allowing the rails to perform the secondary function of geometrically positioning and stabilizing the side members relative to one another.

Figure 9:
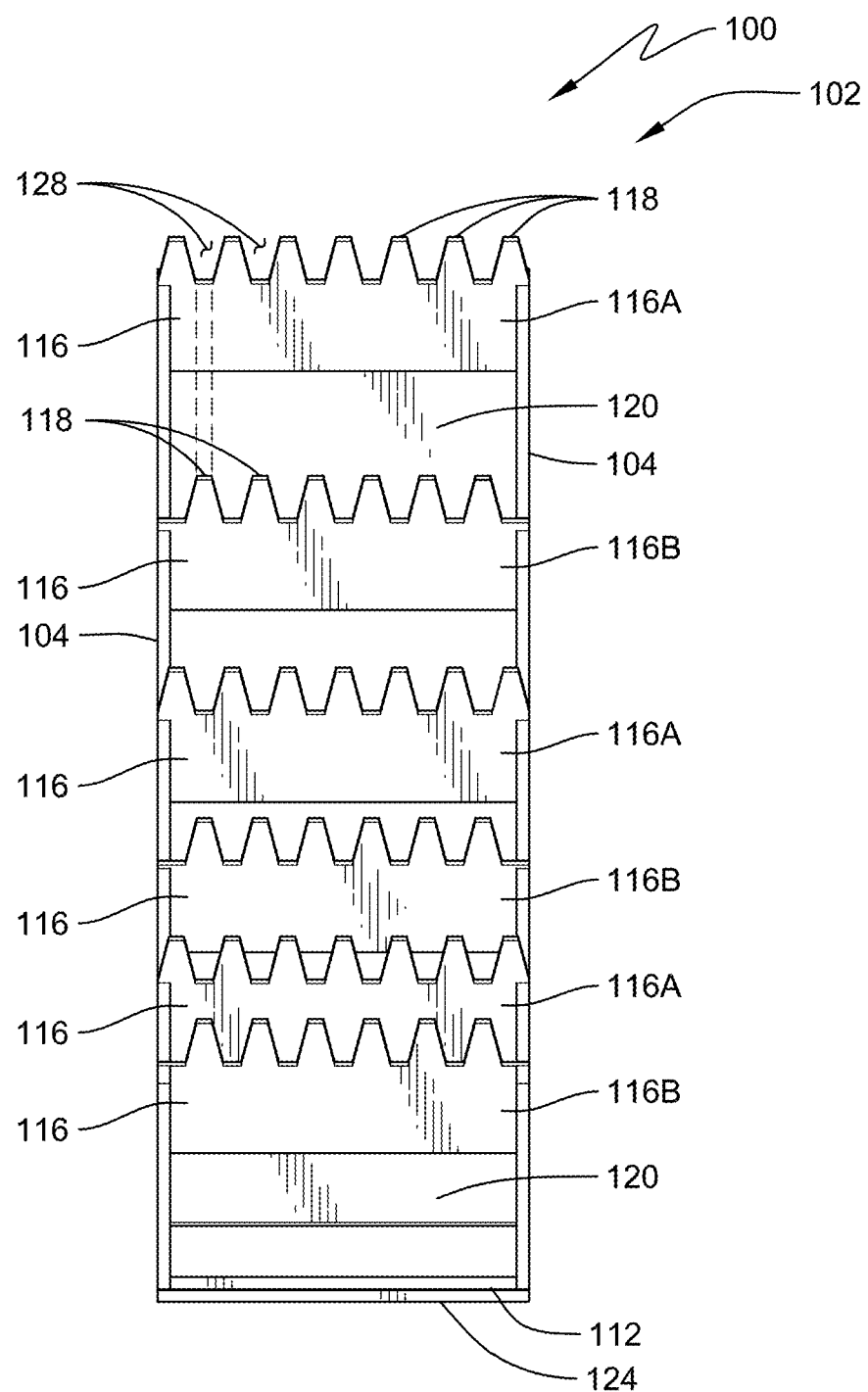
FIG. 9 is a front view of the wheel-stabilizing chock of FIG. 1.

FIG. 9 is a front view of wheel-stabilizing chock 102 of FIG. 1. As illustrated with the dashed-line depictions, the arrangement of teeth 118 on adjacent toothed rails 116 forms a staggered configuration in which the teeth 118 on one rail are positioned to correspond with the valleys 128 (void spaces) between the teeth on an adjacent toothed rail 116. This interleaved pattern is configured to increase the overall density of engagement points between toothed rails 116 and the tire tread, thereby improving grip and distributing restraining force more evenly across the contact area. The staggered configuration also reduces the likelihood of slippage during torquing operations. Additionally, this implementation enables toothed rails 116 to conform more effectively to varied tread patterns, making the apparatus compatible with a broader range of tire types and sizes.

The structure in FIG. 9 also depicts the plurality of teeth 118 (plurality of engagement points) arranged on the wheel-stabilizing chock 102 (support structure) in rows. The engagement points (plurality of teeth 118) in adjacent rows are laterally offset relative to one another to provide distributed contact with the tread portion of the tire to resist rotation of the suspended wheel during application of torque to wheel fasteners (see FIGS. 3 and 4).

Figure 10:
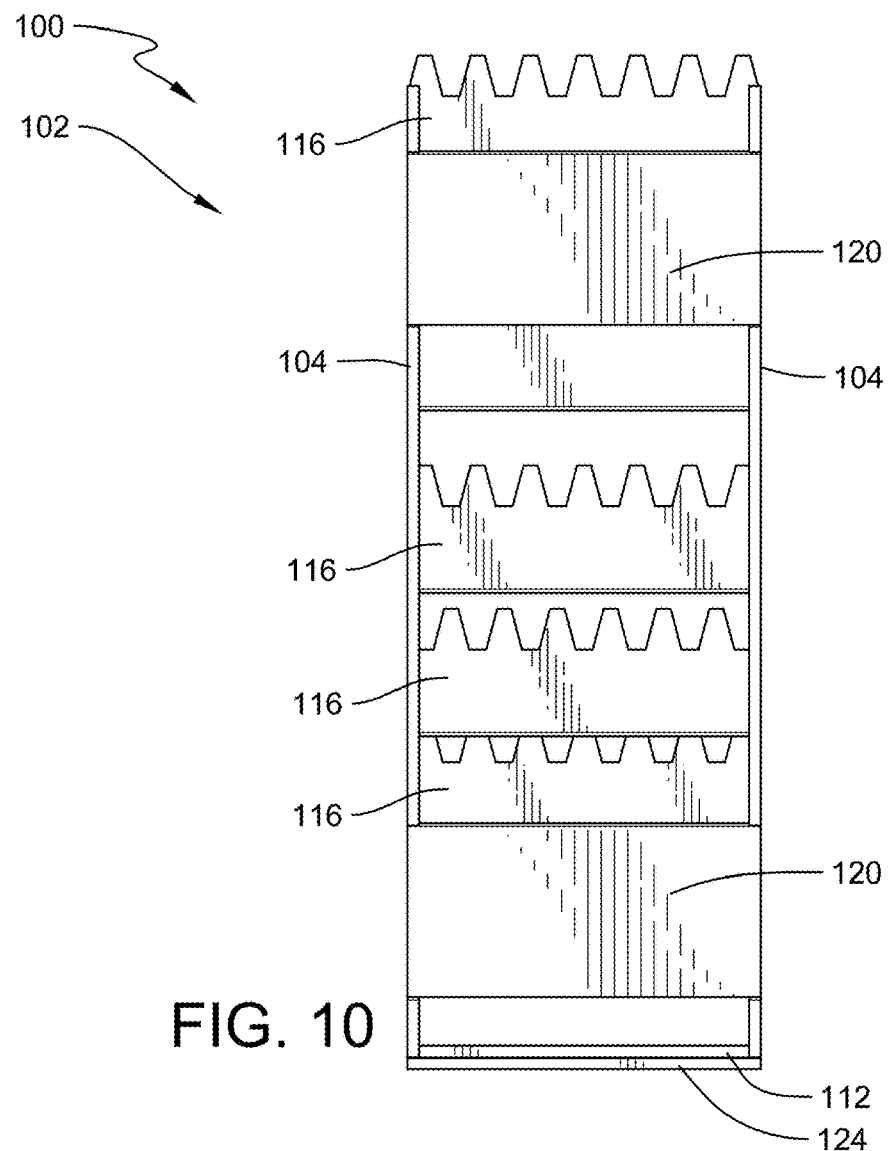
FIG. 10 is a rear view of the wheel-stabilizing chock of FIG. 1.

FIG. 10 is a rear view of the wheel-stabilizing chock 102 of FIG. 1. This view illustrates the rear portion of side members 104 and rear plates 120 that span between them. In the depicted implementation, wheel-stabilizing chock 102 is shown with a pair of rectangular rear plates 120, one located near the upper portions of the side members with the other located near the base of the apparatus. Rear plates 120 are rigidly secured to the side members and contribute to the structural stability of the apparatus by maintaining proper spacing and alignment. Also visible are the toothed rails 116 located on the opposing side of the apparatus. Upon reading this specification, it should be appreciated that, under appropriate circumstances, considering such issues as user preferences, design preference, structural requirements, marketing preferences, cost, available materials, etc., other structural and feature arrangements such as, for example, implementing alternate sizes and quantities of plates, utilizing rigid cross bars, rods or other member shapes, incorporating grips or handles into the cross structures, etc., may be sufficient.

Figure 11:
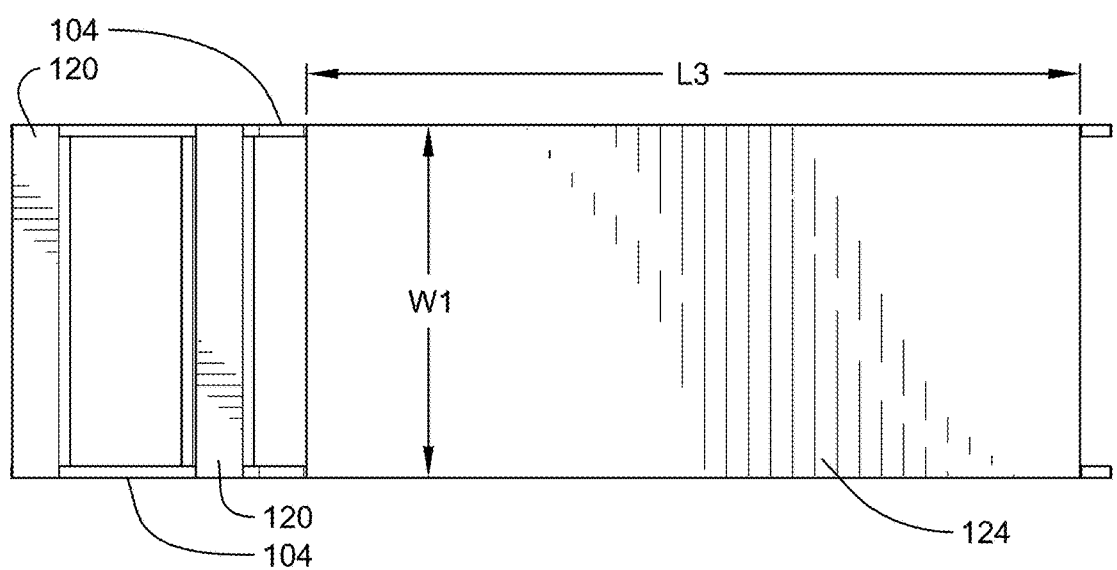
FIG. 11 is a bottom view of the wheel-stabilizing chock of FIG. 1.

FIG. 11 is a bottom view of the wheel-stabilizing chock 102. This view shows the overall footprint of the apparatus, which is optimized to provide both ground stability and compactness for ease of handling and storage. The bottom view also illustrates frictional pad 124 affixed to the bottom of the base plates 114. Frictional pad 124 may comprise Natural Rubber (NR), Synthetic Rubber (EPU, Neoprene, Nitrile) and the like. Rubber and Elastomeric Polyurethane (EPU) provide excellent frictional engagement, durability, ease of manufacturing, and availability. Frictional pad 124 may be bonded or mechanically fastened to the underside of the base plates and may include textured or patterned features to further enhance grip. Alternate friction-enhancing features may be employed in other implementations without departing from the scope of the present disclosure. For example, an arrangement of rubber feet may be joined with the base of the chock. Spikes or other ground-engaging structures may be included in off-road applications. In one implementation, frictional pad 124 extends the full width W1 of wheel-stabilizing chock 102 and comprises a length L3 of about 8.75 inches.

Figure 12:
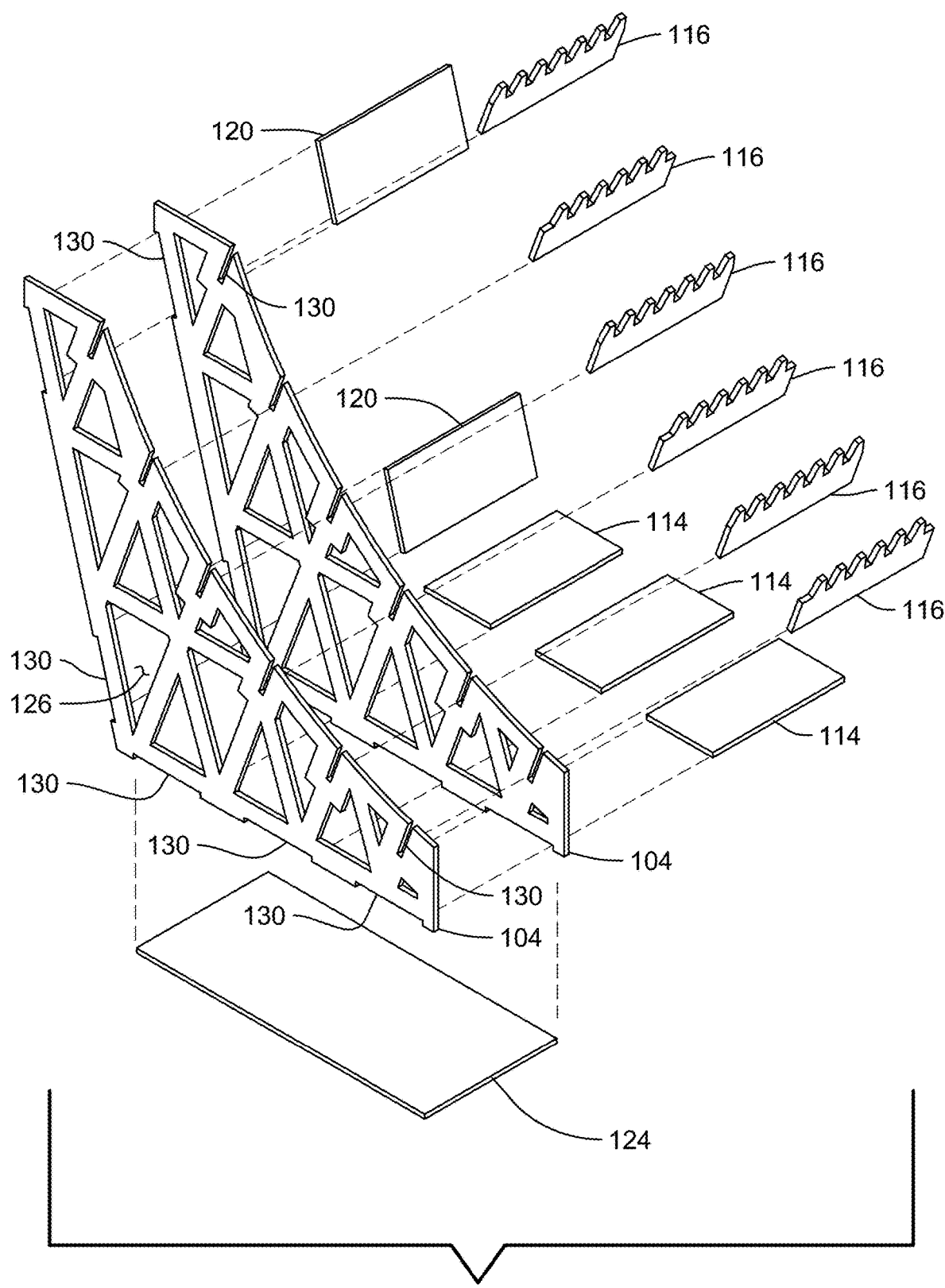
FIG. 12 is an exploded view, illustrating a set of subcomponents forming of the wheel-stabilizing chock of FIG. 1.

FIG. 12 is an exploded view of the wheel-stabilizing chock 102, illustrating the assembly and structural relationship of the subcomponents described in the foregoing figures. As shown, the apparatus comprises a pair of opposing side members 104, a set of 3 base plates 114, a pair of rear plates 120, a series of toothed rails 116, and a frictional pad 124 affixed to the underside of the base plates. In this implementation, all primary structural components, including the side members, base plates, rear plates, and toothed rails, are fabricated from flat steel plate having a uniform thickness of approximately ⅛ inch (11-gauge). This material selection provides the necessary mechanical strength and rigidity to resist deformation under torque loads, while maintaining manageable weight and facilitating fabrication through standard metal fabrication processes.

Side members 104 include recessed mounting receivers 130 configured to receive and engage end portions of toothed rails 116 and connecting plates. These recesses assist in positioning the components during assembly, promoting accurate alignment and angular relationships without the need for external jigs or fixtures. Toothed rails 116 are mounted within slot-shaped receivers 130 located along curved upper portions 110, as shown.

Assembly of the apparatus is performed using thermal welding. Welded joints are applied along the interface between base plates 114, rear plates 120, toothed rails 116, and side members 104. Thermal welding ensures structural continuity, load-bearing capacity, and long-term durability under repeated use.

The uniform material thickness across all subcomponents simplifies fabrication, reduces variations in the required material stock used in fabrication, and allows for efficient volume manufacturing. Toothed rails 116 and side members 104 may be produced using laser cutting, plasma cutting or other CNC-based cutting methods. Base plates 112 and rear plates 120 may be produced using a CNC-based cutting method or by shearing.

All exterior surfaces of wheel-stabilizing chock 102 may be finished with a durable powder coating applied after fabrication and welding. The powder coating provides a hard, wear-resistant, and corrosion-resistant surface that protects the underlying steel from environmental exposure, including moisture, oil, and other chemical contaminants commonly encountered in automotive maintenance environments. The powder coating may be applied in a variety of colors for visual identification, branding, or safety marking, and may also feature a textured or matte finish to reduce glare and enhance grip during handling.

In alternate implementations, other protective finishes may be employed depending on manufacturing preferences, cost considerations, or specific application environments. These may include electroplating (e.g., zinc or chrome), hot-dip galvanization for enhanced corrosion resistance, high-durability enamel paints, or specialty coatings such as ceramic or polymer-based sealants.

While described implementations of wheel-stabilizing chock 102 utilize steel plate construction for all primary components, alternate materials may be employed in other implementations without departing from the scope of the present disclosure. For example, the apparatus may be manufactured using aluminum or similar alloys, which offer a lighter-weight alternative with good corrosion resistance and sufficient strength for most passenger and light-truck vehicle applications. In another implementation, the apparatus may be formed from fiber-reinforced polymer (FRP) composites, such as glass-fiber or carbon-fiber reinforced resins. FRP materials provide a combination of high strength-to-weight ratio and corrosion resistance. The chock components may be molded using compression molding, resin transfer molding, or other established composite manufacturing techniques. Additional material options may include high-strength plastics, such as reinforced nylon or polycarbonate blends, which offer durability and impact resistance for light-duty or consumer-grade versions of the chock. In each case, the selected material may be chosen to optimize performance characteristics such as weight, cost, manufacturability, and environmental durability.

Figure 13:
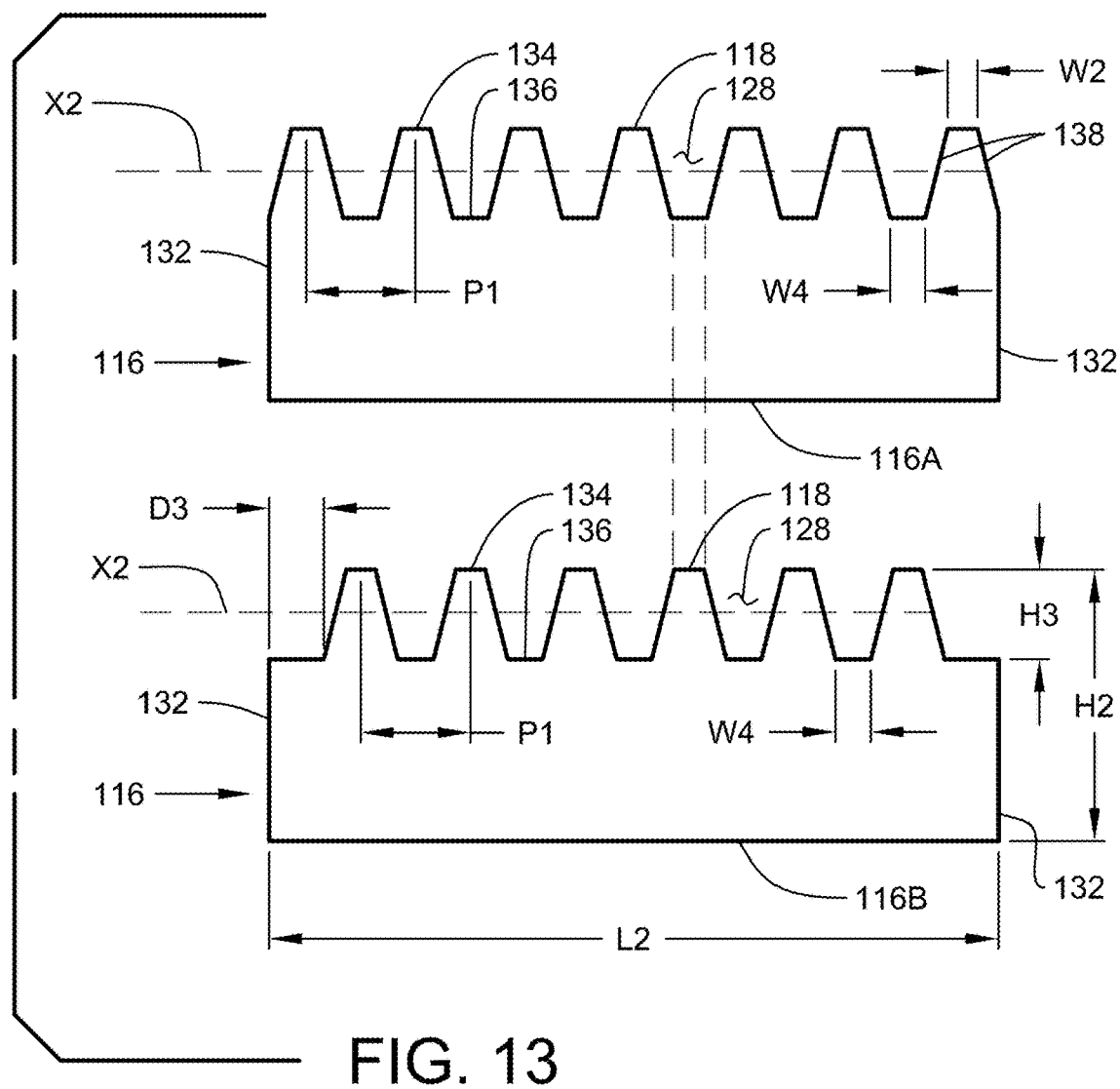
FIG. 13 is a front view illustrating two types of toothed rails of the wheel-stabilizing chock of FIG. 1.

FIG. 13 is a front view illustrating two types of toothed rails 116 used in the wheel-stabilizing chock 102. The two types of toothed rails shown include a first rail type 116A and second rail type 116B.

First rail type 116A has seven teeth 118 with each tooth of substantially identical geometric profile and pitch (center-to-center spacing). Second rail type 116B has six teeth 118 with each tooth having the same geometric profile and pitch as the first rail type 116A. Teeth 118 of first rail type 116A and second rail type 116B differ in that their positions relative to the end portions 132 of the rails are offset laterally. More specifically, the two rail types are configured to form an alternating, staggered configuration of teeth when assembled into the apparatus.

First rail type 116A includes teeth 118 positioned at each end portion 132 of the rail, as shown. Second rail type 116B includes teeth 118 laterally offset inward from each end portion 132, as shown. The unique staggered arrangement is achieved by offsetting the second rail type 116B laterally relative to the first rail type by a distance D3 that is one-half of the tooth pitch P1 (defined herein as the center-to-center distance between adjacent teeth 118). This arrangement results in the teeth on one rail type aligning precisely with the complementary void spaces forming valleys 128 of the adjacent rail type, thereby achieving the intended alternating staggered geometry upon assembly into the apparatus. The resulting staggered tooth configuration significantly increases the density and consistency of contact points between the toothed rails and the tire tread. This enhanced contact improves the apparatus's grip on the tire and distributes applied forces more evenly across the tread during the torquing operation, resulting in improved performance and stability.

Teeth 118 of both toothed rail types comprise a single predetermined geometric profile. It is important to note that the void spaces forming the valleys 128 between adjacent teeth 118 have complementary profiles substantially matching the single predetermined geometric profile of the teeth, in an inverted orientation about longitudinal axis X2. As a result, the void spaces forming the valleys 128 between adjacent teeth 118 are dimensioned to substantially match the inverted tooth profile, having corresponding dimensions that mirror those of the teeth themselves.

In one implementation, each toothed rail 116 has an overall length L2 of approximately 4 inches and an overall height H2 of approximately 1.5 inches. The teeth themselves have a uniform height H3 of approximately 0.5 inches, measured vertically from the base of each tooth of teeth 118 at the valley to the peak 134, as shown. The peak 134 of each tooth of teeth 118 comprises a flat top portion having a width W2 of approximately 0.2 inches and angled sidewalls 138 tapering downward into the adjacent valleys 128, as shown. Adjacent teeth 118 on the same rail are spaced laterally at pitch P1 of about 0.6 inches center-to-center.

The valleys 128 located between adjacent teeth comprise a flat root surface 136 positioned between adjacent angled tooth sidewalls 138. In one implementation, the flat root surface 136 of each valley 128 has a horizontal width W4 of about 0.2 inches, measured from the base of one tooth to the base of an adjacent tooth.

When assembled into the apparatus, the lateral positions of teeth on first toothed rail type 116A align precisely with the complementary valleys 128 of an adjacent second toothed rail type 116B. As previously described, this arrangement is achieved by offsetting the second rail type by D3 comprising half of the pitch distance P1 (e.g., approximately 0.3 inches) relative to the first rail type. Thus, each tooth of teeth 118 on one rail type is positioned directly opposite a corresponding valley 128 on the adjacent rail type, as shown. The resulting staggered configuration promotes effective engagement of the teeth with the tire tread, thus enhancing grip, reducing the risk of tire slip during torquing, and distributing the applied force evenly. This dimensional configuration and geometric arrangement is particularly suitable for engaging standard automotive tires, though it may be adapted through proportional scaling or minor geometric adjustments to accommodate different tire sizes or tread patterns without departing from the scope of this disclosure.

It should be noted that the continuous repeating tooth pattern and staggard geometry of the present implementation allows both toothed rail types to be cut simultaneously from a single steel plate. This method of fabrication speeds the production process, reduces material waste, and ensures dimensional consistency among all rails.

Figure 14:
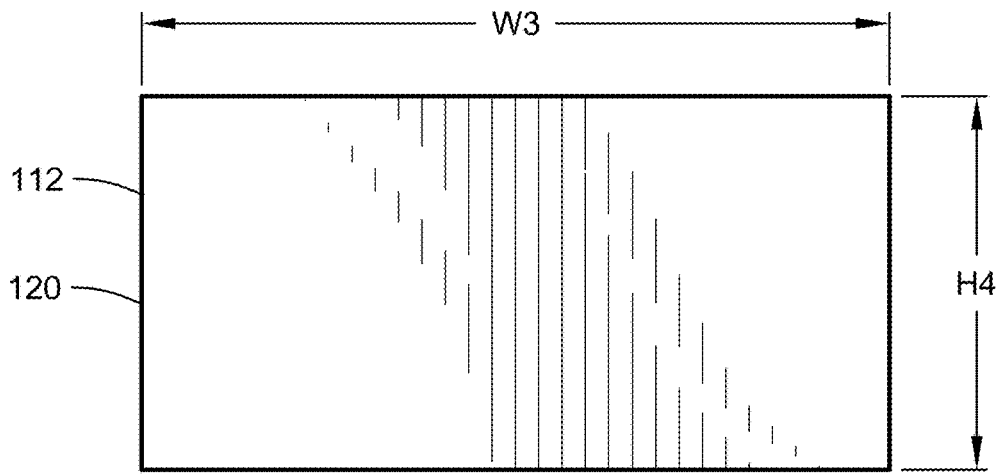
FIG. 14 is a front view illustrating a plate configuration that forms a rear plate and a base plate of the wheel-stabilizing chock of FIG. 1.

FIG. 14 is a front view illustrating a plate configuration that forms both a rear plate and a base plate of the wheel-stabilizing chock 102 of FIG. 1. In this implementation, rear plates 120 and base plates 112 comprise steel plate of identical size, shape, and thickness. Despite serving different functions, the two plates are dimensionally interchangeable. This design choice offers significant manufacturing efficiency by allowing both components to be cut from the same blank or template. In one implementation of the present disclosure, the plates comprise a width W3 of about 4 inches and a height H4 of about 2 inches.

Figure 15:
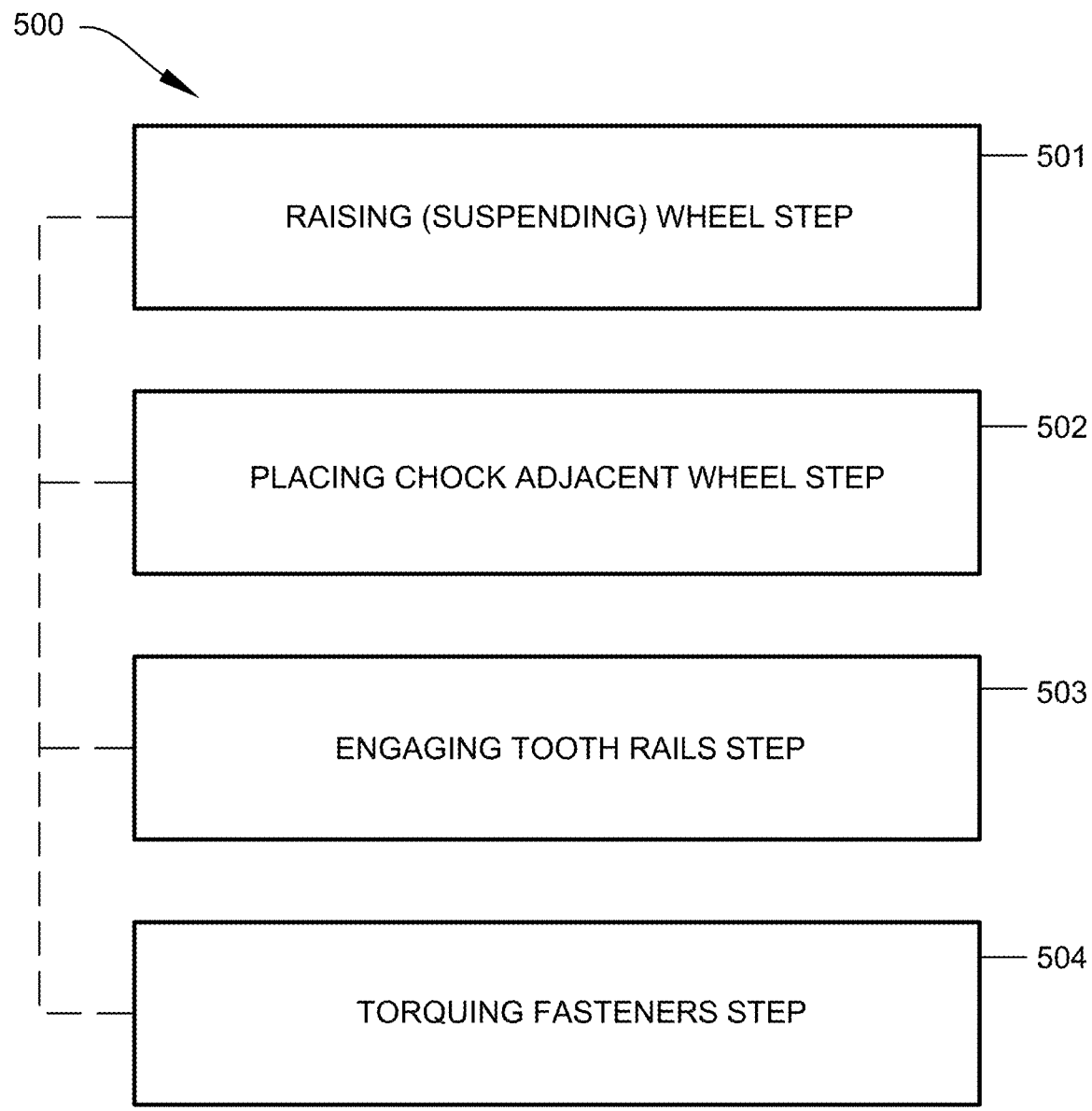
FIG. 15 is a diagram illustrating a method of using the wheel-stabilizing chock to attach a wheel to a vehicle with proper torque.

FIG. 15 is a diagram illustrating method 500 for attaching a wheel to a vehicle with proper torque, in accordance with an implementation of the present disclosure. As shown, method 500 includes a sequence of steps designed to ensure secure wheel attachment while preventing unintended wheel rotation during torquing operations. In a first step (step 501), the vehicle wheel, including a mounted tire, is suspended in an elevated and unloaded position above the ground, such as by raising the vehicle using a jack, lift, or other suitable hoisting mechanism. In this raised position, the wheel is unloaded and free to rotate, which can make it difficult to apply accurate and consistent torque to the fasteners without additional restraint. In a second step (step 502), wheel-stabilizing chock 102 is placed adjacent to the tire. The apparatus includes a base configured to rest on the ground surface, a pair of side members each having a curved arc portion shaped to conform at least partially to the side profile of the tire, and a plurality of toothed rails mounted to the arc portions, each rail having staggered teeth to enhance tread engagement density and contact with the tire tread.

In a third step (step 503), the toothed rails are urged into contact with the tire tread such that the staggered teeth penetrate or nest within the tread grooves, thereby creating a mechanical interlock that inhibits substantial rotation of the wheel during torquing by urging the chock forward until the staggered teeth penetrate or nest within the tread grooves of the tire. This engagement creates a mechanical interference that inhibits substantial rotation of the wheel during torquing. In some implementations, the technician may use their foot to apply additional pressure to the rear of the chock, particularly when working with tires that have shallow tread patterns.

In a fourth step (step 504), the technician torques wheel fasteners to a specified torque value using a torque wrench or other calibrated tool, with the wheel held stationary by the engaged apparatus throughout the operation. With the wheel securely restrained by the apparatus, the technician is able to apply torque in a controlled and consistent manner without requiring the vehicle to be lowered during the procedure.

Thus, method 500 reduces the risk of under- or over-tightening the wheel fasteners, improves procedural efficiency, and enhances safety by minimizing unintended wheel movement during installation.

Although this disclosure has described implementations of the present disclosure, it will be understood that the broadest scope of this disclosure includes modifications such as diverse shapes, sizes, and materials. Such scope is limited only by the below claims as read in connection with the above specification. Further, many other advantages will be apparent to those skilled in the art from the above descriptions and the below claims.

What is claimed is:

1. An apparatus for assisting in torquing of a wheel to a vehicle, said apparatus comprising:

a pair of side members each side member having a bottom portion, a rear portion, and a curved upper portion;

at least one base plate spanning the bottom portion of the side members, forming a base of the apparatus;

a plurality of toothed rails spanning the side members at positions along the curved upper portion;

each toothed rail of the plurality of toothed rails comprising a plurality of teeth configured to engage with a tread portion of a tire mounted to the wheel and prevent rotation of the wheel during torquing; and the plurality of toothed rails includes a first rail type and a second rail type arranged in an alternating configuration, the first rail type having teeth positioned such that peaks of the teeth on the first rail type are configured to align with valleys positioned between the teeth on an adjacent second rail type, thereby forming a staggered arrangement of teeth across the plurality of toothed rails.

2. The apparatus of claim 1, the first rail type comprising teeth having teeth positioned at each end of the first rail type, the second rail type comprising teeth having teeth offset inward from each end of the second rail type by a distance corresponding to one-half of a tooth pitch.

3. The apparatus of claim 1, each of the plurality of toothed rails being angled at a defined angle relative to at least one base plate, the defined angle arranging the plurality of toothed rails to assist engagement with the tire.

4. The apparatus of claim 3, the defined angle being 70 degrees.

5. The apparatus of claim 3, the apparatus comprising six toothed rails spaced evenly along the curved upper portion.

6. The apparatus of claim 1, the curved upper portion having a radius that approximates a curvature of a wheel.

7. The apparatus of claim 1, further comprising at least one rear plate spanning the side members at one or more positions along their respective rear portions.

8. The apparatus of claim 1, having an overall height and an overall length configured to be set against a vehicle tire.

9. The apparatus of claim 8, comprising an overall height of about 11 inches and an overall length of about 12.44 inches.

10. The apparatus of claim 1, the side members being spaced apart about 4 inches.

11. The apparatus of claim 1, the teeth having a flat top and angled sides.

12. The apparatus of claim 1, the peaks of the teeth separated by a distance of about 0.44 inch and the valleys separated a distance of about 0.2 inch.

13. The apparatus of claim 1, the teeth spaced apart a distance of about 0.6 inch.

14. The apparatus of claim 1, the teeth having a uniform height of about 0.5 inches.

15. The apparatus of claim 1, the plurality of toothed rails each having a rail length of about 4 inches and a tooth rail height of about 1.5 inches, and the teeth having a uniform height of about 0.5 inches.

16. The apparatus of claim 1, the base comprising a slip prevention material.

17. The apparatus of claim 16, the slip prevention material comprises a frictional pad affixed to an underside of at least one base plate.

18. A method for attaching a vehicle wheel to a vehicle with proper torque, the method comprising:

suspending the vehicle wheel, including a tire, in an elevated position such that the vehicle wheel is above a ground surface and not under load;

placing a wheel-stabilizing apparatus adjacent to the tire, the wheel-stabilizing apparatus comprising a pair of side members each side member having a bottom portion, a rear portion, and a curved upper portion;

at least one base plate spanning the bottom portion of the side members, forming a base of the apparatus;

a plurality of toothed rails spanning the side members at positions along the curved upper portion; each toothed rail of the plurality of toothed rails comprising a plurality of teeth configured to engage with a tread portion of a tire mounted to the wheel and prevent rotation of the wheel during torquing; and the plurality of toothed rails includes a first rail type and a second rail type arranged in an alternating configuration, the first rail type having teeth positioned such that peaks of the teeth on the first rail type are configured to align with valleys positioned between the teeth on an adjacent second rail type, thereby forming a staggered arrangement of teeth across the plurality of toothed rails;

engaging the plurality of toothed rails with a tread surface of the tire such that the staggered arrangement of teeth mechanically interlock with tread grooves of the tire to inhibit substantial rotation of the vehicle wheel; and torquing wheel fasteners to a specified torque value while the vehicle wheel remains suspended and restrained by the wheel-stabilizing apparatus.

\* \* \* \* \*